Sept. 15, 1942.   H. CAMINEZ   2,295,931
RELIEF VALVE
Filed April 26, 1941   2 Sheets-Sheet 1

INVENTOR.
HAROLD CAMINEZ
BY Walter S. Bleston
ATTORNEY

Sept. 15, 1942. H. CAMINEZ 2,295,931
RELIEF VALVE
Filed April 26, 1941 2 Sheets-Sheet 2

INVENTOR.
HAROLD CAMINEZ
BY Walter S. Bleston
ATTORNEY

Patented Sept. 15, 1942

2,295,931

UNITED STATES PATENT OFFICE 2,295,931

RELIEF VALVE

Harold Caminez, Hackensack, N. J., assignor to Air Associates Incorporated, Bendix, N. J., a corporation of New York Application April 26, 1941, Serial No. 390,498

1 Claim. (Cl. 137—53)

The present invention relates to a relief valve for fluids under pressure, and more particularly for liquids in hydraulic systems, such as oil, used in the landing gear system of aircraft. The invention contemplates providing a valve in which only a very slight difference exists in the pressure heads when the valve starts to open and when the valve is open to permit the amount of fluid to pass equal to the full capacity of the valve. It is a further purpose of the invention to provide a spring-loaded poppet-type relief valve of the afore-mentioned properties in which the spring may be smaller and, consequently, the entire valve may be lighter and less bulky than valves of the customary structure having similar properties regarding such difference in pressure.

The invention consists in the provision of means for the indicated purpose as will be disclosed in the description given hereinafter and the accompanying drawings showing an embodiment thereof by way of example.

Figure 1:
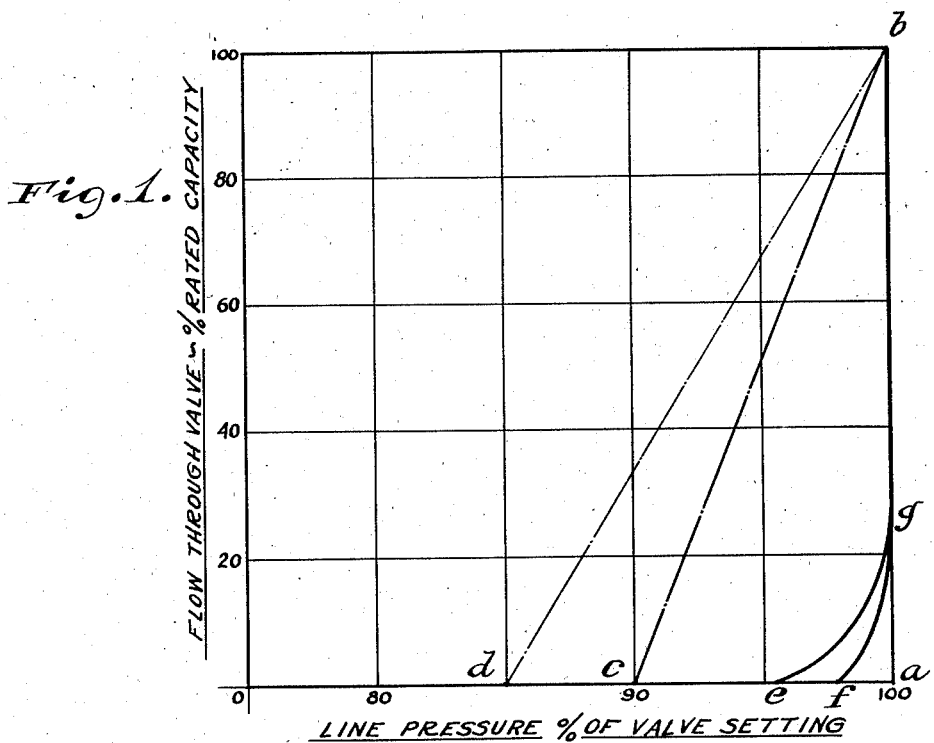
Fig. 1 is a diagram illustrating the performance of a customary type valve and of the new valve.

Referring, now, to the drawings, in Fig. 1 the performance of a relief valve is defined by the flow through the relief valve in per cent of the rated capacity as a function of the line pressure in per cent of the relief valve setting. In an ideal valve, the performance would be represented by the straight line $ab$ which indicates that the valve would open at exactly that line pressure for which the valve is set, and the same pressure would prevail in the line no matter whether the valve is just starting to open or whether it is entirely open so as to permit the valved medium to flow through the valve at a rate equal to the full capactiy of the valve. However, this cannot be actually attained in spring-loaded poppet valves. In a conventional valve if the pressure for which the valve is set is that at which it is fully open, opening will already begin at a lower pressure, e. g. at a pressure of 90%, that means at point $c$ of the diagram, Fig. 1. In order to lift the valve poppet to 100% rated flow capacity, the pressure must rise to the 100% setting. The performance of the conventional valve with rising pressure is approximately illustrated by the straight line $cb$. In the closing of the valve certain resistances occur which prevent the poppet from tightly engaging its seat at the original 90% pressure. In fact, the valve will close at a lower pressure only, e. g. at 85% of the set pressure. Hence, the performance with falling pressure corresponds to the line $bd$. It may be possible to improve the valve performance by the conventional measure of increasing the number of the spring convolutions if a coil spring is used. However, any such improvement would be accompanied by the drawback of a larger and heavier spring having a lower spring range and, therefore, also a bulkier and heavier valve casing and a longer adjustment screw in order to provide the necessary adjustment range generally required for valves of this type. This makes such valves objectionable particularly for use in aircraft.

Now, the purpose of the invention is to attain a performance and, with the means hereinafter described, does attain a performance which approximately corresponds to the line $fgb$ in the opening and to the line $bge$ in the closing operation of a spring-loaded poppet valve, simultaneously avoiding or at least greatly reducing the mentioned drawback.

Figure 2:
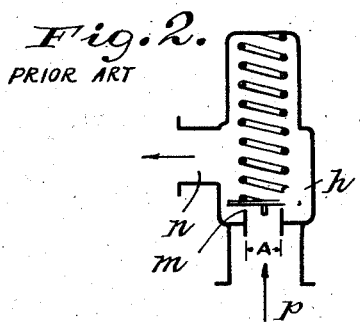
Fig. 2 is a schematic drawing of a conventional valve.
Figure 3:
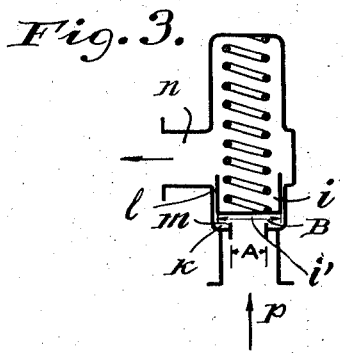
Fig. 3 is a schematic drawing of the new valve.

The principle of the invention will be explained with reference to Figs. 2 and 3 schematically showing the conventional and the novel valve respectively. It will be noticed that in the case of Fig. 3 the valve is in the shape of a piston $i$ whose bottom $i'$ cooperates with the seat $m$ in the valving operation. The valved fluid can pass through a narrow conduit $l$ to the outlet $n$. In Fig. 2, on the other hand, there is the conventional valve $h$ which opens unrestrictedly into the wide outlet $n$. Now, if A is the seat area, and $F_1$ the spring force when the valve is on its seat, then $$P_1 = \frac{F_1}{A}$$

is the pressure required just to cause the valve to start opening; or in other words, $P_1$ is the opening pressure at zero flow through the valve. Assuming that in Fig. 2 the lift of the valve must be $S$ to permit 100% flow of the rated capacity and that the rate of the spring is $D$, the spring force obtained when the valve is open will be $F_2 = F_1 + D \times S$. In valves of conventional design, the springs are frequently so selected that DS is approximately $.1F_1$. With this value $F_2 = 1.1F_1$ and if $P_2$ is the pressure in the line required for full rated flow, $$P_2 \times A = 1.1 F_1$$

hence $$P_2 = 1.1 P_1$$

This corresponds approximately to the line $cb$ in Fig. 1.

Now, as to the system of Fig. 3, if the area of the piston $i$ is designated with B and the pressure in the chamber $k$ under the piston with R, then the pressure in the line required just to open the valve will be $$P_1 = \frac{F_1}{A}$$

since R is zero when there is no flow. At full-rated flow, however, we obtain in approximation $$P_2 \times A + R(B-A) = F_2$$

or, if the spring of Fig. 3 is similar to that of Fig. 2, $$P_2 \times A + R(B-A) = 1.1 F_1$$

wherefrom it follows, if $P_2$ is to equal $P_1$:

$$R(B-A) = .1 F_1$$

It will be apparent when considering Fig. 3 that the value of R depends on the length and width of the narrow conduit or orifice $l$, or generally speaking, on the size of the orifice permitting the fluid to pass from the chamber above the valve seat to the outlet. Furthermore, it will be clear that there exists an optimum in the size of that orifice because if the orifice is too wide the pressure in the line will rise from the beginning of the opening of the valve until full capacity flow is reached just as in the case of Fig. 2. On the other hand, if the orifice is too small a pressure drop will occur owing to the fact that the piston area B is larger than the seat area A, and the piston may act like an ordinary slide valve. Hence, by properly selecting the sizes of B and the cross-section of the orifice on which R depends, it is possible to attain conditions which at least approximate the desirable state of $P_2 = P_1$. If, for instance, B is selected equal to 4A, it follows from $R(B-A) = .1 F_1$ that $$3AR = .1 F_1$$

and $$3R = \frac{.1 F_1}{A} = .1 P_1$$

or $$R = .033 P_1$$

Hence, if the aforementioned orifice is so selected, which may be done by trial, that $R = .033 P_1$, then the line pressure will be approximately constant from the moment when the valve begins to open until the flow has reached the full-rated capacity. Similar conditions will prevail during the closing of the valve. In practice, minor deviations will occur owing to friction. However, the performance of the spring in the novel device can at least follow the lines $fgb$ and $bge$ of Fig. 1 as I have found by experiments.

Thus, the present invention permits greatly improving the performance of the valve without altering the size or quality of the spring, or reversely, the valve according to the invention has a capacity of two to three times that of a conventional valve of similar performance wherein performance is defined as hereinbefore explained with reference to Fig. 1.

Figure 4:
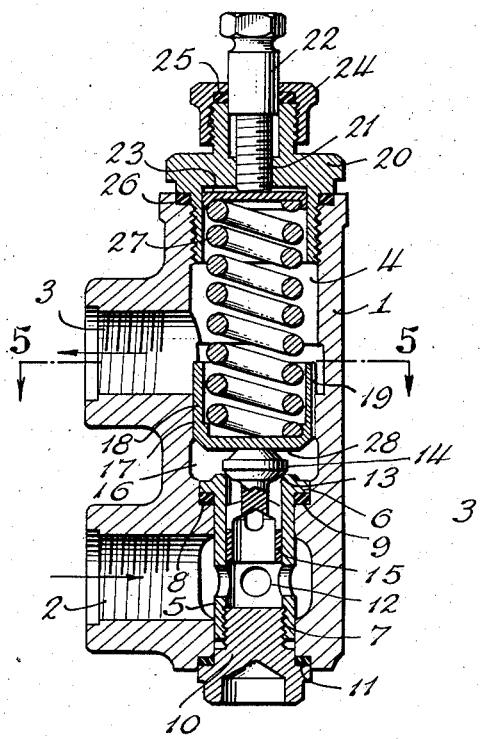
Fig. 4 is a cross-section of an embodiment of the invention.
Figure 5:
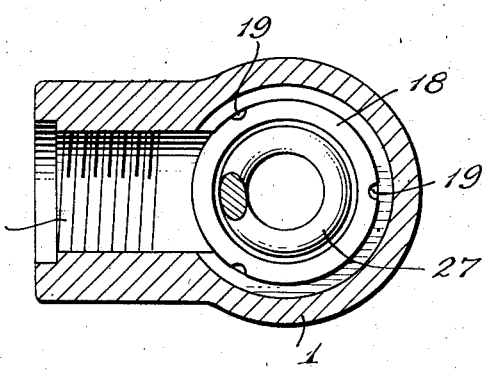
Fig. 5 is a cross-section along line 5—5 in Fig. 4.
Figure 6:
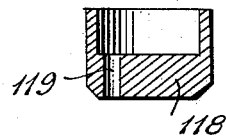
Fig. 6 is a cross-section of a modified part.

The principle developed in the foregoing statement is applied in the embodiments of Figs. 4 to 6. The relief valve according to Figs. 4 and 5 has a casing 1 with an inlet 2 and an outlet 3. A bore 4 intersects the inlet and outlet and contains in its lower portion a tubular member 5 provided with a flanged upper end 6 and with an interior threading 7 of its lower end. Flange 6 bears on a gasket 8 placed on an inner shoulder 9 of the casing, and is held in position by a headed screw member 10 engaging the thread 7. Another gasket 11 is provided between the screw member 10 and the casing. A transverse opening 12 of the tubular member 5 communicates with the inlet 2, and the flanged end of the same member is shaped as a seat 13 for a poppet valve 14 guided therein at 15. Thus, the valve member 14 is exposed with its lower face to the pressure of the fluid which may enter through inlet 2 and opening 12 into the interior of the tube 5. The head of the valve member projects into a chamber 16 having a cylindric extension 17 co-axial with the valve seat 13. In that extension a piston 18 is axially movable which bears on the head of the valve member 14 so that if the valve member opens the piston 18 will be shifted upward thereby increasing the space of the chamber 16. A conduit is provided to connect the chamber 16 with the outside. This conduit constitutes a narrow orifice or passage for the fluid valved into the chamber 16. In the embodiment of Figs. 4 and 5 the conduit is constituted by three grooves 19 in the outer wall of the piston 18 so as to connect chamber 16 with the outlet 3. Although only one groove of accordingly larger cross-section may be used instead of the three equally spaced grooves shown in Fig. 5, I prefer the illustrated symmetric groove arrangement in order to avoid cocking of the piston in its guide and an increase of friction which may result in an erratic operation. The upper end of the bore 4 of the casing is closed by a screw cap 20 with a central tapped hole 21. A headed screw 22 is passed through 21 so as to bear on a disc 23 axially slideable in the interior of the cap 20. The connection is made tight with the aid of another cap 24 with gasket 25. Similarly a gasket 26 is applied between casing 1 and cap 20. A coil spring 27 is positioned between disc 23 and the piston so as to force piston 18 on valve member 14, and, consequently, the latter on its seat 13 against the pressure prevailing in the inlet 2 and the interior of the tubular member 5. By means of the screw 22 acting on disc 23 the spring tension determinative of the inlet pressure required to open valve 14 can be adjusted within certain limits.

Whereas in the following description of the operation of the novel device I shall name oil as the valved fluid, I desire it to be understood that this particular medium is mentioned merely by way of example and that my invention is applicable with equal advantage to systems operating with other liquid or gaseous fluids.

If casing 1 with its inlet 2 is connected to a hydraulic system the pressure medium, e. g. oil, will fill the spaces below the valve member 14 so that the pressure head bearing on the lower face of member 14 will tend to raise the valve member against the restraint of spring 27. Interiorly of chamber 16 and in the spaces communicating with the outlet 3 an equal pressure will prevail which may or may not be the atmospheric pressure but in any event will be lower than the inlet pressure. When, now, the inlet pressure reaches that amount for which the spring 27 is set, the valve will begin to open simultaneously pushing ahead the piston 18 and thereby very slightly compressing spring 27. Further compression can take place only when the compressing force increases simultaneously. The additional force required for this purpose is furnished by the oil entering the chamber 16 and acting on the bottom face 28 of the piston which is appreciably larger than the bottom face of the valve member 14. There will be, of course, a pressure drop of the oil entering the chamber 16. However, even a very slight increase of the pressure in chamber 16 over the pressure head on top of the piston will permit the valve to open a little more thereby admitting an increased flow into the chamber and, consequently, causing the pressure therein to rise. On the other hand, oil escapes through the conduit 19 thereby decreasing the static pressure which otherwise would build up in the chamber. However, the oil flow will produce a certain dynamic pressure acting on the valve member and the piston and tending to compress the spring 27. Now, the velocity of the oil current will depend on the static pressure in chamber 16 and on the resistance the current encounters in conduit 19 owing to its length and more or less restricted width. All these occurrences act together and simultaneously, but it will be apparent that they can be controlled by correctly selecting the cross-section of the conduit and the areas of the valve member and the piston in relation to each other. The correct dimension can be easily obtained by trial so that, as stated hereinbefore, the valve has the desired performance which will be attained when at 100% set pressure a quantity of oil equal to the rated capacity of the valve passes through the conduit or orifice and in which the opening of the valve will start and the closing of the valve will be complete at pressures only slightly lower than the set pressure. In this connection, I have found it convenient to make the piston area between two and ten times that of the valve and then starting with a narrow conduit to increase its width until the performance of the valve is satisfactory. The named values two and ten of the ratio of the areas are certainly not to be used exclusively, meaning that other values may be advantageously chosen in consideration of all circumstances and particularly of the rate of the spring employed. However, with a spring of conventional rate so that the above-named condition $DS=.1F$ exists, a value of the ratio of the areas much below two will require a very narrow conduit which may be difficult to make exactly to size. On the other hand, a value of more than ten would result in a valve unduly large and bulky, and would therefore, defeat the purpose of the invention which is to provide a small size valve to accomplish the desired result. In a particular case I have obtained very satisfactory results with a piston area four times that of the valve seat and a total orifice area of .1 times that of the valve seat, whereas in another valve, a smaller one, good results were obtained with a piston area about 7.5 times and an orifice area of about .25 times that of the valve seat. However, it should be understood that these figures are stated merely as an example, and that I do not intend to limit the scope of my invention to the named figures which are to be illustrative only.

The actual location of the conduit connecting the chamber with the outside, for instance, with a drain (not shown) attached to the outlet 3 is immaterial. In the modification of Fig. 6 the conduit 119 is shown passing through the piston 118 instead of one of the grooves 19 in Fig. 5 so that the piston 118 may be readily substituted for the piston 18 in the valve of Fig. 4. However, there is one feature of the piston 18 differing from that of piston 118. It has been mentioned hereinbefore that the value of R, i. e. the pressure in chamber 16, greatly depends on the width and length of the restricted conduit between chamber 16 and outlet 3. Now, it will be seen that the length of the restricted conduit, i. e. the effective length of the grooves 19 in Fig. 4, is variable and depends on the length of the cylindrical area contacted by the piston wall. In other words, in the position of Fig. 4 the effective length of the grooves is a maximum; this length, however, will decrease when the piston and, thus, the lower edge of its side wall, is shifted upward against the restraint of spring 27. Hence, the resistance to flow decreases when the spring force increases owing to the pressure acting on the piston bottom. This feature may also be utilized in order to prevent the pressure in chamber 16 from rising beyond a predetermined value.

With respect to the illustrated embodiment of Fig. 4, I have described a valve member 14 as separate from the piston 18. From the description of the functions of the two members, it will be apparent that they move in unison. Notwithstanding this fact, the members 14 and 18 should not be made of one piece, because any inaccuracies of the piston 18 will not interfere with the tightness of valve member 14 seating on its seat 13 if the valve member is a separate unit. Another important feature in this respect is that the poppet valve and the piston are separately guided, namely, the poppet valve 14 in the tubular member 5 and the piston 18 in the cylindrical casing portion 17. This structure has particular merits in high pressure valves of light weight if, e. g. the casing is made of a light metal such as aluminum, and the insert member 5 is made of steel. Then the piston may move freely with a loose fit required to avoid appreciable friction which would impair the desired valve characteristics, whereas the poppet valve will be so guided as to engage its seat in a position exactly co-axial with the latter to insure tightness even if the difference of pressure below and above the valve is only slight. The co-axial arrangement of the parts is helpful to avoid chattering which frequently occurs in relief valves for high pressure.

In the foregoing disclosure of my invention a valve has been described in which the setting is such that the valve will start to open and will complete its closing at pressures very slightly below that at which full-rated flow is attained. It should be noted, however, that it is also possible, by selecting the ratio of poppet and piston and the dimension of the orifice accordingly, to provide a valve performance or operating curve in which the pressure at full-rated flow through the valve would be actually less than the pressure required to start opening or complete closing of the valve. This may be desirable in certain applications of the valve.

Many modifications and alterations of the illustrated embodiment may be made without departing from the essence of my invention, the scope of which, therefore, shall be limited only by the appended claim.

I claim:

In a relief valve of the type described, a valve casing an ancillary poppet valve unit including a hollow body formed at one end as a valve seat and a poppet valve plunger lying within said body, coacting with said valve seat and disposed so as freely to slide within said body, and means for mounting said poppet valve unit within said relief valve casing, including flanged seats formed in said relief valve casing, at one end thereof and at a median portion thereof, respectively, and gaskets of elastic material fitting upon said flanged seats, said ancillary valve unit being formed in two sections mutually engaging one another by threaded coupling means, whereby said sections can be separately inserted into the end and median portion respectively, of said relief valve casing and then can be screwed together until each section tightly engages the corresponding gasket of said relief valve casing and thereby forms a substantially fluid tight connection therewith.

HAROLD CAMINEZ.